(12) United States Patent
Jiang

(10) Patent No.: US 9,377,843 B2
(45) Date of Patent: Jun. 28, 2016

(54) SYSTEMS AND METHODS FOR MANAGING CURRENT CONSUMPTION BY AN ELECTRONIC DEVICE

(71) Applicant: Broadcom Corporation, Irvine, CA (US)

(72) Inventor: Xicheng Jiang, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 333 days.

(21) Appl. No.: 13/907,810

(22) Filed: May 31, 2013

(65) Prior Publication Data

US 2014/0337647 A1  Nov. 13, 2014

Related U.S. Application Data

(60) Provisional application No. 61/820,643, filed on May 7, 2013.

(51) Int. Cl.
| | |
|---|---|
| *G06F 1/32* | (2006.01) |
| *G06F 1/08* | (2006.01) |
| *G06F 1/06* | (2006.01) |

(52) U.S. Cl.
CPC ........ *G06F 1/324* (2013.01); *G06F 1/06* (2013.01); *G06F 1/08* (2013.01); *G06F 1/3237* (2013.01); *Y02B 60/1217* (2013.01); *Y02B 60/1221* (2013.01); *Y02B 60/32* (2013.01)

(58) Field of Classification Search
CPC ......... G06F 1/324; G06F 1/32; G06F 1/3237; G06F 1/06; G06F 1/08
See application file for complete search history.

(56) References Cited

U.S. PATENT DOCUMENTS

| | | | | |
|---|---|---|---|---|
| 5,142,684 A | * | 8/1992 | Perry et al. | 713/320 |
| 6,219,797 B1 | * | 4/2001 | Liu et al. | 713/500 |
| 6,346,833 B1 | * | 2/2002 | Kuroki | 327/119 |
| 2004/0221187 A1 | * | 11/2004 | Durand | G06F 1/3203 713/300 |
| 2008/0182630 A1 | * | 7/2008 | Parks | G06F 1/3293 455/574 |
| 2014/0115366 A1 | * | 4/2014 | Joo et al. | 713/323 |

* cited by examiner

*Primary Examiner* — Zahid Choudhury
*Assistant Examiner* — Siamak S Hefazi
(74) *Attorney, Agent, or Firm* — McDermott Will & Emery LLP

(57) ABSTRACT

Systems and methods for managing current consumption by an electronic device are provided. The electronic device includes first and second clock units. The first clock unit generates a first reference clock signal based on a first current input. The second clock unit generates a second reference clock signal based on a second current input greater than the first current input. The system includes a control module configured to identify an application to be executed. The control module is configured to determine whether the application is associated with a first current consumption level or a second current consumption level greater than the first current consumption level. The control module is configured to select the first or second reference clock signal based on whether the application is determined to be associated with the first or second current consumption level. The system includes circuitry configured to execute the application based on the selection.

19 Claims, 6 Drawing Sheets

SYSTEMS AND METHODS FOR MANAGING CURRENT CONSUMPTION BY AN ELECTRONIC DEVICE

CROSS-REFERENCES TO RELATED APPLICATIONS

The present application claims the benefit of U.S. Provisional Patent Application Ser. No. 61/820,643, titled "Systems and Methods for Managing Current Consumption by an Electronic Device," filed on May 7, 2013, which is hereby incorporated by reference in its entirety for all purposes.

FIELD

The subject technology generally relates to electronic devices and, in particular, relates to systems and methods for managing current consumption by electronic devices.

BACKGROUND

An electronic device may have circuitry that operates according to a clock signal. The clock signal may be produced by a clock generator, and may oscillate between a high state and a low state. The clock signal, for example, may be utilized like a metronome to coordinate actions of the circuitry. The signal can range from a simple symmetrical square wave to more complex arrangements. Use of the clock signal may have certain implications on the amount of current that is consumed by an electronic device, especially when the electronic device is used to run a particular application.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

In the following detailed description, numerous specific details are set forth to provide a full understanding of the subject technology. It will be apparent, however, that the subject technology may be practiced without some of these specific details. In other instances, structures and techniques have not been shown in detail so as not to obscure the subject technology.

Figure 1:
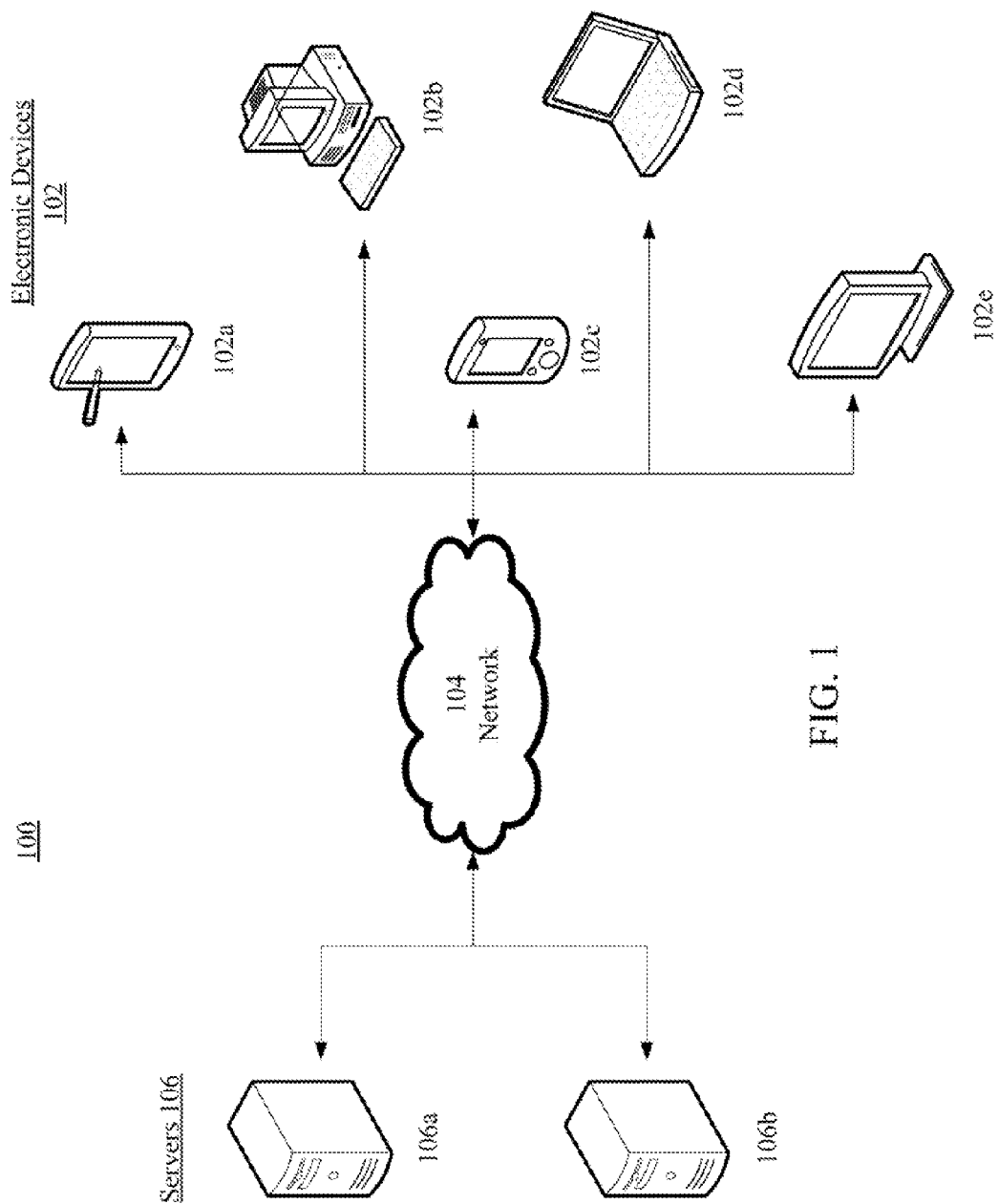
FIG. 1 illustrates an example of an environment in which electronic devices may be used to run various applications, in accordance with various aspects of the subject technology.

FIG. 1 illustrates an example of environment 100 in which electronic devices 102 (e.g., electronic devices 102a, 102b, 102c, 102d, and 102e) may be used to run various applications, in accordance with various aspects of the subject technology. Environment 100 includes servers 106 (e.g., servers 106a and 106b) and electronic devices 102 connected over network 104. Network 104 can include, for example, any one or more of a personal area network (PAN), a local area network (LAN), a campus area network (CAN), a metropolitan area, network (MAN), a wide area network (WAN), a broadband network (BBN), a peer-to-peer network, an ad-hoc network, the Internet, and the like. Further, network 104 can include, but is not limited to, any one or more network topologies such as a bus network, a star network, a ring network, a mesh network, a star-bus network, tree or hierarchical network, and the like.

Electronic devices 102 and servers 106 can have any processing hardware, memory, and communications capability necessary to perform some or all of the operations disclosed herein. In one or more implementations, electronic devices 102 can be desktop computers (e.g., electronic device 102b), mobile computers (e.g., electronic device 102d), tablet computers (e.g., including e-book readers such as electronic device 102a), mobile devices (e.g., smartphones or personal digital assistants such as electronic device 102c), set top boxes (e.g., for a television with one or more processors coupled thereto and/or embedded therein such as electronic device 102e), video game consoles, or any other devices having memory, processing hardware, and/or communications capabilities.

Electronic devices 102 may be used to run various applications, such as operating systems, gaming applications, multimedia playback applications (e.g., video and/or audio playback), utility applications, communication applications (e.g., to provide communications with other electronic devices 102 and/or servers 106), and/or other programs. Electronic devices 102 may comprise various circuitry to execute these applications. In some aspects, electronic devices 102 may communicate over network 104 with servers 106 to run the applications (e.g., electronic devices 102 may serve as client devices). In some aspects, electronic devices 102 may be standalone devices that do not need to communicate over any network to run the applications.

Electronic devices 102 that run communication applications may have corresponding circuitry that require the use of an accurate clock signal. As a result, these electronic devices 102 may each include a radio chip that has a high quality clock generator (e.g., an external crystal and on-chip driver) that generates the accurate clock signal. The circuitry configured to execute the communication applications, in addition to circuitry configured to execute other applications, may be synchronized to the accurate clock signal. Because the high quality clock generator consumes a large amount of current (e.g., in the milliamp range) in order to generate the accurate clock signal (e.g., by reducing phase noise), electronic devices 102 may also each include a second low quality clock generator that generates a less accurate clock signal but consumes less current (e.g., a house-keeping clock in a power management unit). The less accurate clock signal may be used when electronic devices 102 are in a power saving state (e.g., a sleep state, a hibernation state, a suspended state, a standby state, etc). While in this state, electronic devices 102 may use the less accurate clock signal to keep track of time. However, electronic devices 102 do not run any applications while in this state. Rather, electronic devices 102 monitor for any activity that would bring the devices out of the power saving state.

Because use of the accurate clock signal consumes a large amount of current, it may not be ideal to use the more accurate clock signal for all applications that are run on electronic devices 102, especially since not all applications may require the use of the accurate clock signal. According to various aspects of the subject technology, systems and methods are provided for managing current consumption by an electronic device 302. In some aspects, applications that do not require the more accurate clock signal may be identified. For these identified applications, the high quality clock generator may be powered off and the less accurate clock signal maybe used to execute these applications, thereby reducing current consumption.

Figure 2:
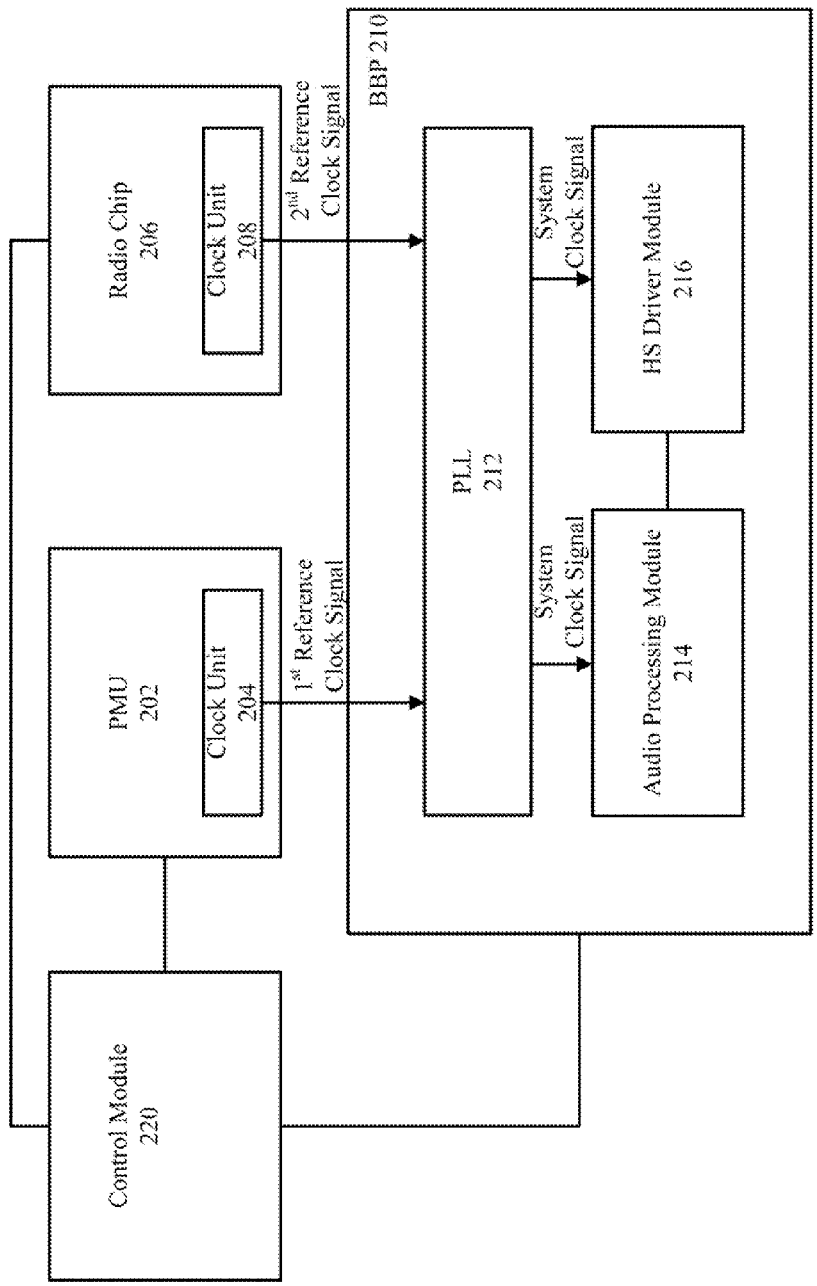
FIG. 2 is a block diagram illustrating components of an electronic device, in accordance with various aspects of the subject technology.

FIG. 2 is a block diagram illustrating components of electronic device 102, in accordance with various aspects of the subject technology. For the purposes of illustration, electronic device 102 is shown as being configured to run an audio playback application (e.g., for playing different types of audio such as MP3s). However, it is understood that electronic device 102 may have other configurations to run other types of applications.

As shown in FIG. 2, electronic device 102 includes power management unit (PMU) 202, radio chip 206, baseband processor (BBP) 210, and control module 220. PMU 202 may manage one or more power saving states of electronic device 102, while radio chip 206 may manage communications between electronic device 102 and another device (e.g., server 106). PMU 202 includes first clock unit 204, which may be a low quality clock generator that generates, a first reference clock signal based on a first current input (e.g., 1 to 10 microamps of current that first clock unit 204 consumes to generate the first reference clock signal). In one or more implementations, first clock unit 204 includes a first crystal configured to oscillate at a first frequency (e.g., 32 kilohertz). Radio chip 206 includes second clock unit 208, which may be a high quality clock generator that generates a second reference clock signal based on second current input (e.g., 10-15 milliamps of current that second clock unit 208 consumes to generate the second reference clock signal). In one or more implementations, second clock unit 208 includes a second crystal configured to oscillate at a second frequency (e.g., 26/52 megahertz).

Since second clock unit 208 may be a high quality clock generator compared to first clock unit 204, second clock unit 208 consumes more current than first clock unit 204 (e.g., the second current input is greater than the first current input) to generate a more accurate reference clock signal. In this regard, the second reference clock signal has less phase noise and has a higher frequency compared to the first reference clock signal. In some aspects, the second current input is at least 100 times greater than the first current input. In some aspects, the frequency of the second reference clock signal may be at least 500 times greater than the frequency of the first reference clock signal.

BBP 210 may provide the audio playback functionality of electronic device 102. In one or more implementations, BBP 210 includes phase lock loop (PLL) 212, which may receive either the first reference clock signal or the second reference clock signal, and generate a system clock signal using the received clock signal as a reference. BBP 210 also includes circuitry configured to execute the audio playback application of electronic device 102 based on the system clock signal received from PLL 212 (e.g., the system clock signal may be utilized like a metronome to coordinate actions of the circuitry). The circuitry for electronic device 102 includes audio processing module 214 and headset (HS) driver module 216. In one or more implementations, audio processing module 214 may process audio and perform other operations to facilitate audio playback. HS driver module 216 may receive an audio signal from audio processing module 214 and increase a power of the audio signal such that it may have sufficient power to be delivered to a headset that may be coupled to electronic device 102.

As shown in FIG. 2, control module 220 is coupled to PMU 202, radio chip 206, and BPP 210. According to certain aspects, control module 220 may manage current consumption by electronic device 102 by identifying an application to be executed by electronic device 102 (e.g., the audio playback application), and selecting an appropriate reference clock signal (e.g., the first reference clock signal or the second reference clock signal) for the application being executed. Depending on which reference clock signal is selected, electronic device 102 may consume more or less current. For example, control module 220 may determine that an application may require the more accurate clock signal (e.g., the second reference clock signal), and as a result, may select the second reference clock signal. PLL 212 may generate the system clock signal based on this selection. Thus, electronic device 102 consumes more current than it would have if the first reference clock signal were selected (e.g., because the second current input for generating the second reference clock signal is greater than the first current input for generating the first reference clock signal). However, in this situation, the circuitry of electronic device 102 may execute the application using a higher quality system clock signal, thereby allowing higher performance to be achieved.

If control module 220 determines that the application, such as the audio playback application, does not require an accurate clock signal, control module 220 may select the first reference clock signal. PLL 212 may generate the system clock signal based on this selection. Thus, electronic device 102 consumes less current than it would have if the second reference clock signal were selected (e.g., because the first current input for generating the first reference clock signal is less than the second current input for generating the second reference clock signal). In this situation, the circuitry may execute the application using a lower quality system clock signal, and control module 220 may power down second clock unit 208, thereby reducing current consumption.

Electronic device 102 provides numerous advantages over conventional devices. Unlike conventional devices, electronic device 102 may utilize both first clock unit 204 (e.g., with a 32 kilohertz crystal oscillator) and second clock unit 208 (e.g., with a 26/52 megahertz crystal oscillator) for executing applications. Furthermore, electronic device 102 may provide a low bandwidth, low power PLL 212 that is configured to use either the first reference clock signal or the second reference clock signal as a reference signal.

According to certain aspects, being able to use the first reference clock signal may allow the circuitry of electronic device 102 to be simplified, thereby allowing additional reduction in power consumption. In one or more implementations, the circuitry can be simplified when use of the first reference clock signal is compatible with the application. For example, MP3 audio playback typically involves using a sampling rate of 48 kilohertz. This sampling rate may not necessarily be compatible with the second reference clock signal since the second reference clock signal is typically a 26/52 megahertz signal and the sampling rate is not a terminating rational number multiple, such as an integer multiple, of the second reference clock signal. As a result, the circuitry may require complex circuits (e.g., filters, frequency conversion circuits, etc.) to convert a frequency of a system clock signal (which uses the second reference clock signal as a reference) to be compatible with the sampling rate. However, if the first reference clock signal is used as a reference (e.g., at 32 kilohertz), the sampling rate may be a terminating rational number multiple of the first reference clock signal (e.g., 48 kilohertz divided by 32 kilohertz is 1.5). As a result, the circuitry of electronic device 102 can be simplified and would not need the complex circuits to perform frequency conversion of the system clock signal (which uses the first reference clock signal as a reference) to be compatible with the sampling rate. With the simplified circuitry, additional power can be reduced. According to certain aspects, electronic device 102 may reduce audio power consumption by at least 30-50% compared to conventional audio playback devices used in the past decade from 2002 to 2013.

Figure 3:
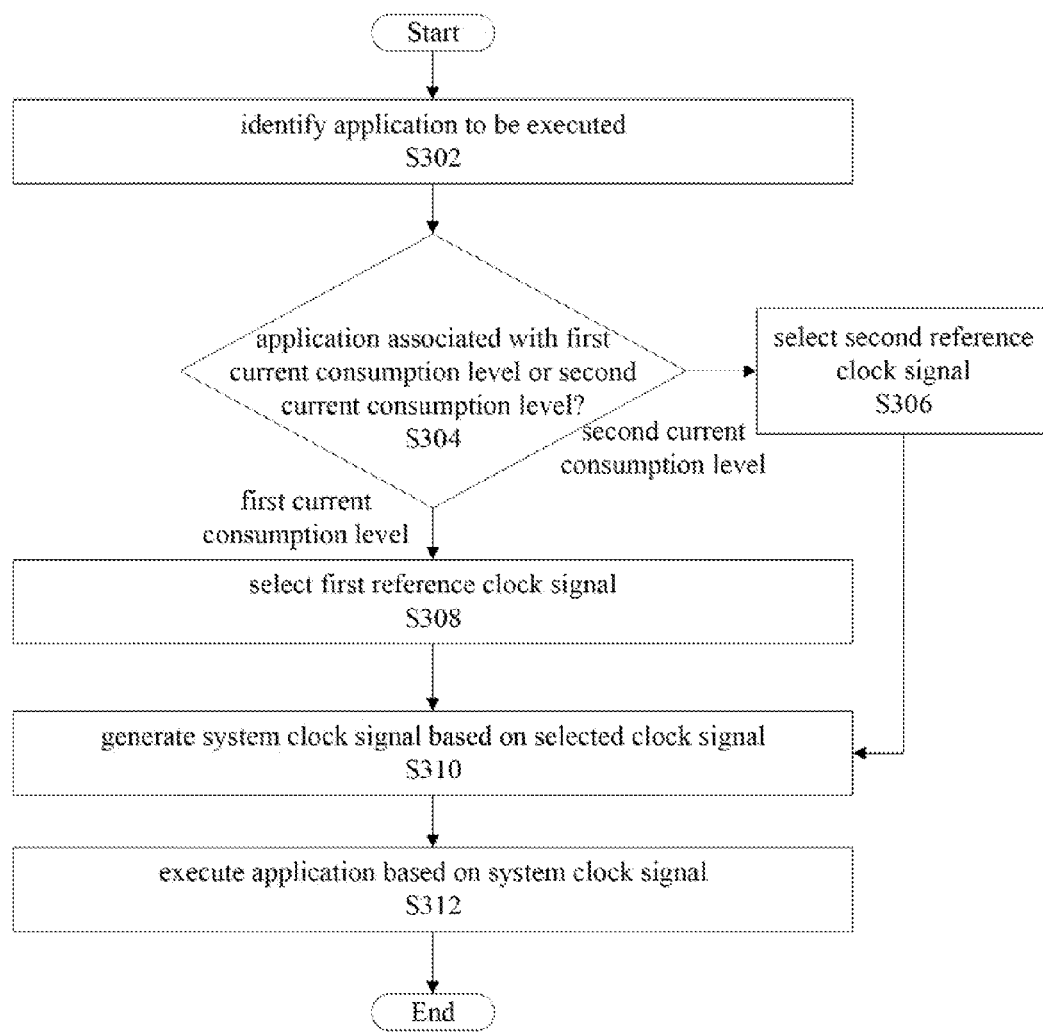
FIG. 3 illustrates an example of a method for managing current consumption by an electronic device, in accordance with various aspects of the subject technology.

FIG. 3 illustrates an example of method 300 for managing current consumption by electronic device 102, in accordance with various aspects of the subject technology. Although method 300 is described herein with reference to the examples of FIGS. 1 and 2, method 300 is not limited to these examples. Furthermore, although method 300 is illustrated in the order shown in FIG. 3, it is understood that method 300 may be implemented in a different order.

According to certain aspects, control module 220 identifies an application to be executed (S302). Control module 220, for example, may determine (e.g., via user input or other feedback) that a user of electronic device 102 desires to run an application using electronic device 102. In some aspects, control module 220 determines whether the application (e.g., as identified in S302) is associated with a first current consumption level or a second current consumption level greater than the first current consumption level (S304). As discussed above, use of the more accurate clock signal may require more current input than use of the less accurate clock signal. In this regard, association with the second current consumption level may indicate that the application requires the use of the more accurate clock signal. Conversely, association with the first current consumption level may indicate that the application does not require the use of the more accurate clock signal. Thus, control module 220 may determine whether the application is one that would require the use of the more accurate clock signal or the less accurate clock signal by determining whether the application is associated with the first current consumption level or the second current consumption level.

Control module 220 may determine whether the application is associated with the first current consumption level or the second current consumption level based on user input (e.g., a user of electronic device 102 may specify which current consumption level is desired). In some aspects, control module 220 may determine whether the application is associated with the first current consumption level or the second current consumption level by determining a minimum current consumption level associated with the application. The minimum current consumption level, for example, may indicate the minimum amount of current input needed to generate a reference clock signal with a high enough accuracy and/or low enough noise for the application to use. In one or more implementations, control module 220 may determine that the application is associated with the first current consumption level if this level is greater than or equal to the minimum current consumption level. Control module 220 may determine that the application is associated with the second current consumption level if this level is greater than or equal to the minimum current consumption level and the first current consumption level is less than the minimum current consumption level.

Control module 220 may determine whether the application is associated with the first current consumption level or the second current consumption level by observing a compatibility of the application with a particular current consumption level. The first current consumption level, for example, may be an indication of the current needed to generate the first reference clock signal, while the second current consumption level may be an indication of the current needed to generate the second reference clock signal. In one or more implementations, control module 220 may determine whether a sampling rate associated with the application is a terminating rational number multiple of a frequency of the first reference clock signal or a frequency of the second reference clock signal. If the sampling rate is a terminating rational number multiple of the frequency of the first clock signal, then control module 220 may determine that the application is associated with the first current consumption level. If the sampling rate is a terminating rational number multiple of the frequency of the second clock signal, then control module 220 may determine that the application is associated with the second current consumption level.

If control module 220 determines that the application is associated with the second current consumption level, control module 220 selects the second reference clock signal (S306). PLL 212 receives this selected clock signal and generates a system clock signal based on it (S310) (e.g., generating the system clock signal using the second reference clock signal as a reference). PLL 212 may provide the system clock signal to the circuitry (e.g., audio processing module 214 and/or HS driver module 216 in FIG. 2). The circuitry executes the application based on the system clock signal received from PLL 212 (S312).

If control module 220 determines that the application is associated with the first current consumption level, control module 220 selects the first reference clock signal (S308), PLL 212 receives this selected clock signal and generates a system clock signal based on it (S310) (e.g., generating the system clock signal using the first reference clock signal as a reference). PLL 212 may provide the system clock signal to the circuitry (e.g., audio processing module 214 and/or HS driver module 216 in FIG. 2). The circuitry executes the application based on the system clock signal received from PLL 212 (S312). Even though the first reference clock signal (e.g., from PMU 202) is typically used when electronic device 102 is in a power saving state and when no applications are being run, the circuitry may still execute the identified application using the first reference clock signal as a reference when electronic device 102 is not in a power saving state.

According to various aspects of the subject technology, first clock unit 204 may be further configured to provide two different modes of operation. A first mode of operation may be referred to as a low power mode of operation, while a second mode of operation may be referred to as an intermediate mode of operation. In the low power mode of operation, first clock unit 204 may generate a low reference clock signal by consuming a low amount of current (e.g., less than or equal to 1 microamp). In the intermediate mode of operation, first clock unit 204 may generate an intermediate reference clock signal by consuming an intermediate amount of current that is greater than the low amount of current (e.g., greater than 1 microamp, such as 10-20 microamps), but is nevertheless lower than the amount of current consumed by second clock unit 208 when second clock unit 208 generates the second reference clock signal. The low power mode of operation maybe useful when electronic device 102 enters into a power saving state and a minimal amount of current consumed by first clock unit 204 is desired. The intermediate mode of operation may be useful when applications require a clock signal with more accuracy (e.g., less noise) compared to the low reference clock signal, but does not otherwise require a clock signal with the amount of accuracy that can be generated by second clock unit 208. The low reference clock signal and the intermediate reference clock signal may have the same frequency.

In this regard, the first reference clock signal may be considered as comprising either the low reference clock signal or the intermediate reference clock signal, and the first current input (e.g., consumed to generate the first reference clock signal) may be considered as comprising either the low amount of current (e.g., consumed to generate the low reference clock signal) or the intermediate amount of current (e.g., consumed to generate the intermediate reference clock signal). The low reference clock signal may be referred to as a first sub-clock signal, the low amount of current may be referred to as a first sub-current input, the intermediate reference clock signal may be referred to as a second sub-clock signal, and the intermediate amount of current may be referred to as a second sub-current input.

Figure 4:
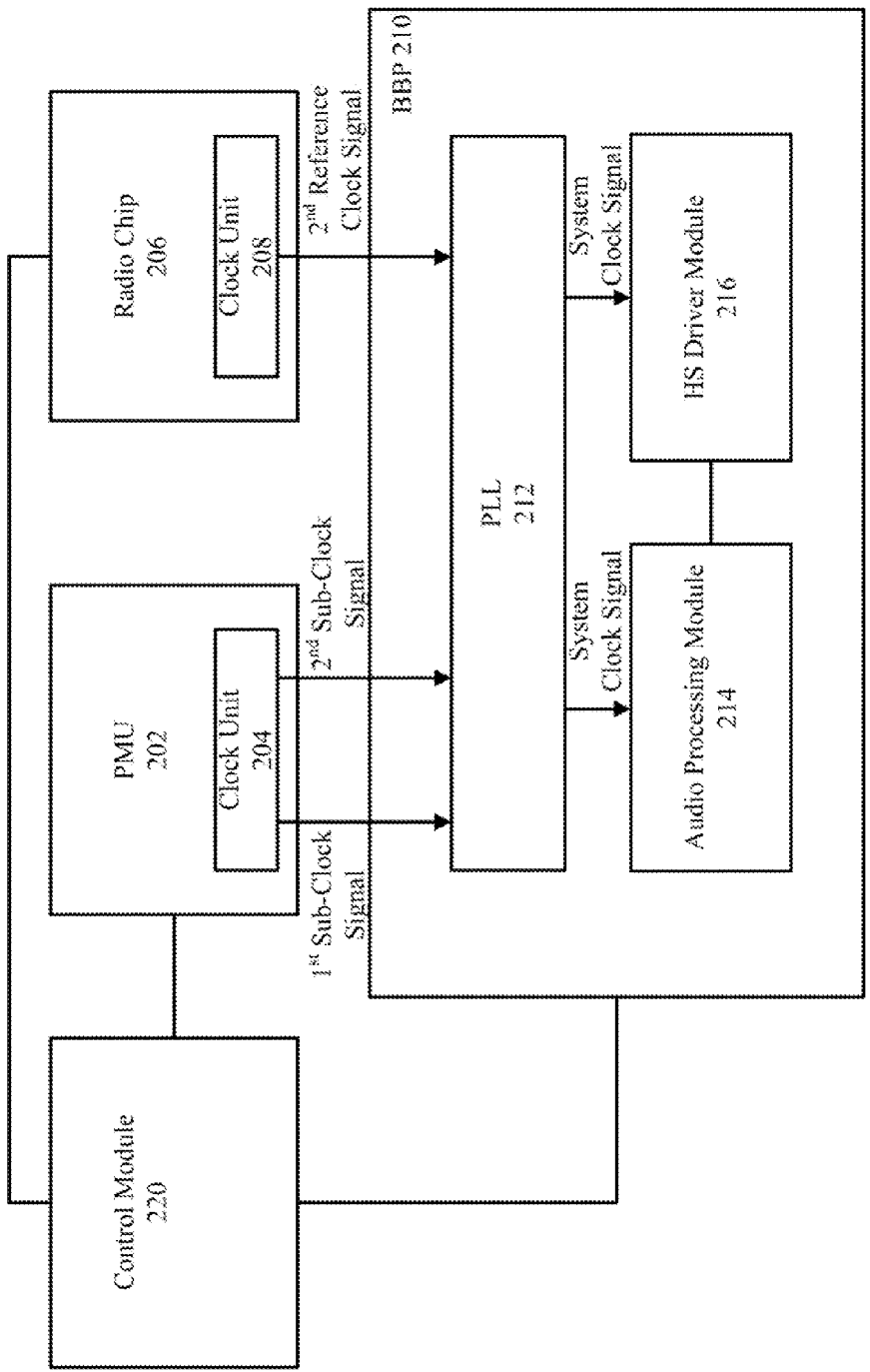
FIG. 4 illustrates an example of an electronic device utilizing a low power mode of operation and an intermediate mode of operation, in accordance with various aspects of the subject technology.

FIG. 4 illustrates an example of electronic device 102 utilizing the low power mode of operation and the intermediate mode of operation, in accordance with various aspects of the subject technology. Electronic device 102 shown in FIG. 4 is the same as electronic device 102 shown in FIG. 2, except that the first reference clock signal in FIG. 2 is now replaced in FIG. 4 by the first sub-clock signal and the second sub-clock signal.

Figure 5:
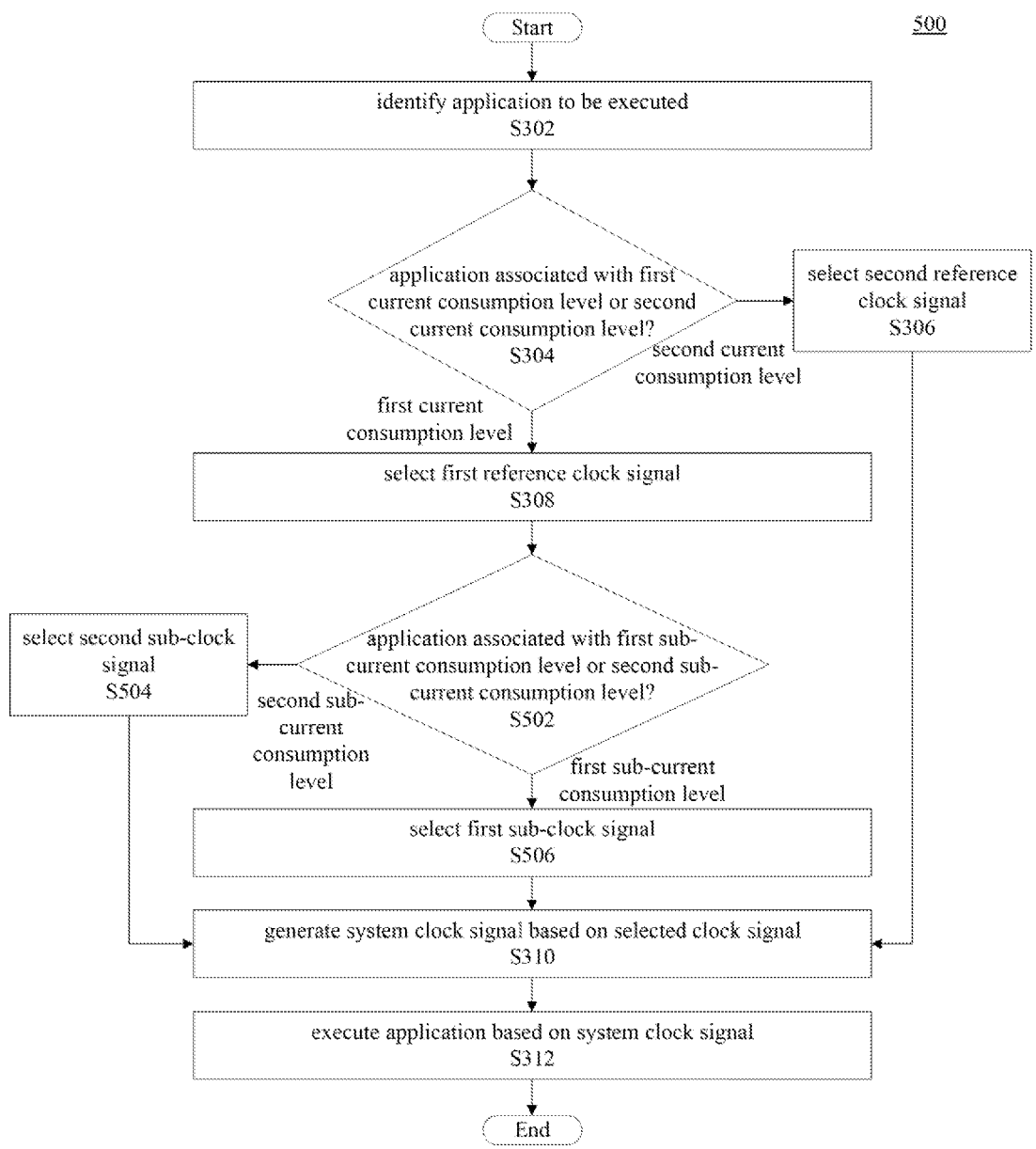
FIG. 5 illustrates an example of a method for managing current consumption by an electronic device that takes into account the low power mode of operation and the intermediate mode of operation, in accordance with various aspects of the subject technology.

FIG. 5 illustrates an example of method 500 for managing current consumption by electronic device 102 that takes into account the low power mode of operation and the intermediate mode of operation, in accordance with various aspects of the subject technology. Although method 500 is described herein with reference to the examples of FIGS. 1 and 4, method 500 is not limited to these examples. Furthermore, although method 500 is illustrated in the order shown in FIG. 5, it is understood that method 500 may be implemented in a different order. Method 500 shown in FIG. 5 is the same as method 300 shown in FIG. 3, except that after the first reference clock signal is selected in S308, method 500 includes additional processing to determine whether the low power mode of operation or the intermediate mode of operation is to be used.

The first current consumption level, as discussed with respect to S304, may include either a first sub-current consumption level or a second sub-current consumption level. According to certain aspects, after the first reference clock signal is selected in S308, control module 220 determines whether the application (e.g., identified in S302) is associated with the first sub-current consumption level or the second sub-current consumption level (S502). As discussed above, use of the intermediate reference clock signal (e.g., the second sub-clock signal) may require more current input than use of the low reference clock, signal (e.g., the first sub-clock signal). In this regard, association with the second sub-current consumption level may indicate that the application requires the use of the intermediate reference clock signal. Conversely, association with the first sub-current consumption level may indicate that the application does not require a clock signal more accurate than the low reference clock signal. Thus, control module 220 may determine whether the application is one that would require the use of the intermediate reference clock signal or the low reference clock signal by determining whether the application is associated with the first sub-current consumption level or the second sub-current consumption level.

If control module 220 determines that the application is associated with the second sub-current consumption level, control module 220 selects the second sub-clock signal (S504). PLL 212 receives this selected clock signal and generates a system clock signal based on it (S310) (e.g., generating the system clock signal using the second sub-clock signal as a reference). PLL 212 may provide the system clock signal to the circuitry, which executes the application based on the system clock signal received from PLL 212 (S312).

If control module 220 determines that the application is associated with the first sub-current consumption level, control module 220 selects the first sub-clock signal (S506). PLL 212 receives this selected clock signal and generates a system clock signal based on it (S310) (e.g., generating the system clock signal using the first sub-clock signal as a reference). PLL 212 may provide the system clock signal to the circuitry, which executes the application based on the system clock signal received from PLL 212 (S312).

Figure 6:
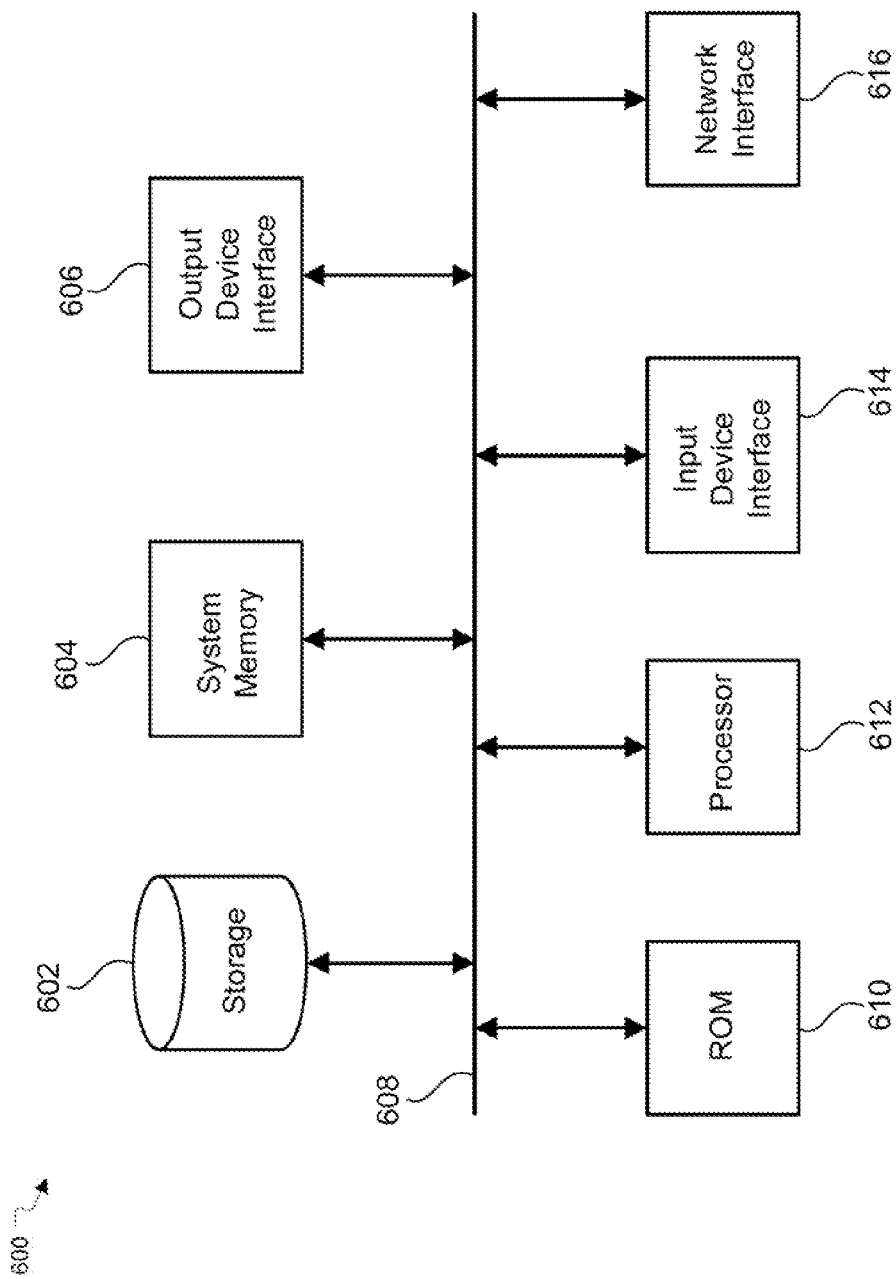
FIG. 6 conceptually illustrates an electronic system with which aspects of the subject technology may be implemented.

FIG. 6 conceptually illustrates electronic system 600 with which aspects of the subject technology may be implemented. Electronic system 600, for example, can be a desktop computer, a laptop computer, a tablet computer, a server, a switch, a router, a base station, a receiver, a phone, a personal digital assistant (PDA), any device that utilizes more than one clock generator, or generally any electronic device that transmits signals over a network. Such an electronic system includes various types of computer readable media and interfaces for various other types of computer readable media. Electronic system 600 includes bus 608, processing unit(s) 612, system memory 604, read-only memory (ROM) 610, permanent storage device 602, input device interface 614, output device interface 606, and network interface 616, or subsets and variations thereof.

Bus 608 collectively represents all system, peripheral, and chipset buses that communicatively connect the numerous internal devices of electronic system 600. In one or more implementations, bus 608 communicatively connects processing unit(s) 612 with ROM 610, system memory 604, and permanent storage device 602. From these various memory units, processing unit(s) 612 retrieves instructions to execute and data to process in order to execute the processes of the subject disclosure. The processing unit(s) can be a single processor or a multi-core processor in different implementations.

ROM 610 stores static data and instructions that are needed by processing unit(s) 612 and other modules of the electronic system. Permanent storage device 602, on the other hand, is a read-and-write memory device. This device is a non-volatile memory unit that stores instructions and data even when electronic system 600 is off. One or more implementations of the subject disclosure use a mass-storage device (such as a magnetic or optical disk and its corresponding disk drive) as permanent storage device 602.

Other implementations use a removable storage device (such as a floppy disk, flash drive, and its corresponding disk drive) as permanent storage device 602. Like permanent storage device 602, system memory 604 is a read-and-write memory device. However, unlike storage device 602, system memory 604 is a volatile read-and-write memory, such as random, access memory. System memory 604 stores any of the instructions and data that processing unit(s) 612 needs at runtime. In one or more implementations, the processes of the subject disclosure are stored in system memory 604, permanent storage device 602, and/or ROM 610. From these various memory units, processing unit(s) 612 retrieves instructions to execute and data to process in order to execute the processes of one or more implementations.

Bus 608 also connects to input and output device interfaces 614 and 606. Input device interface 614 enables a user to communicate information and select commands to the electronic system. Input devices used with input device interlace 614 include, for example, alphanumeric keyboards and pointing devices (also called "cursor control devices"). Output device interface 606 enables, for example, the display of images generated by electronic system 600. Output devices used with output device interface 606 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 6, bus 608 also couples electronic system 600 to a network (not shown) through network interface 616. In this manner, the computer can be a part of a network of computers (such as a local area network ("LAN"), a wide area network ("WAN"), or an Intranet, or a network of networks, such as the Internet. Any or all components of electronic system 600 can be used in conjunction with the subject disclosure.

Many of the above-described features and applications may be implemented as software processes that are specified as a set of instructions recorded on a computer readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. In one or more implementations, the computer readable media does not include carrier waves and electronic signals passing wirelessly or over wired connections, or any other ephemeral signals. For example, the computer readable media may be entirely restricted to tangible, physical objects that store information in a form that is readable by a computer. In one or more implementations, the computer readable media is non-transitory computer readable media, computer readable storage media, or non-transitory computer readable storage media.

In one or more implementations, a computer program product (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to analyze and control an operation or a component may also mean the processor being programmed to analyze and control the operation or the processor being operable to analyze and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that, the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited to the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various, aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A system comprising:
   at least one control circuit configured to:
   identify an application to be executed;
   determine whether the application utilizes a first reference clock signal having a first accuracy or a second reference clock signal having a second accuracy that is greater than the first accuracy based at least in part on whether the application is associated with a first current consumption level or a second current consumption level greater than the first current consumption level and whether a sampling rate associated with the application is a terminating rational number multiple of a first frequency of the first reference clock signal or a second frequency of the second reference clock signal, the first reference clock signal being associated with the first current consumption level and the second reference clock signal being associated with the second current consumption level; and
   select the first reference clock signal or the second reference clock signal based on whether the application is determined to be associated with the first current consumption level or the second current consumption level, wherein the first reference clock signal is generated based on a first current input, and wherein the second reference clock signal is generated based on a second current input greater than the first current input; and
   a circuitry configured to execute the application based on the selection.

2. The system of claim 1, further comprising:
   a first clock unit configured to generate the first reference clock signal based on the first current input; and
   a second clock unit configured to generate the second reference clock signal based on the second current input.

3. The system of claim 2, wherein the first clock unit comprises a first crystal configured to oscillate at the first frequency, wherein the second clock unit comprises a second crystal configured to oscillate at the second frequency, and wherein the second frequency is at least 500 times greater than the first frequency.

4. The system of claim 2, wherein the control circuit is configured to power down the second clock unit if the selection comprises the first reference clock signal.

5. The system of claim 1, wherein a noise level associated with the second reference clock signal is less than a noise level associated with the first reference clock signal.

6. The system of claim 1, wherein the selection comprises the first reference clock signal if the application is determined to be associated with the first current consumption level, and wherein the selection comprises the second reference clock signal if the application is determined to be associated with the second current consumption level.

7. The system of claim 6, wherein the application is determined to be associated with the first current consumption level, wherein the first current consumption level comprises a first sub-current consumption level or a second sub-current consumption level, wherein the second sub-current consumption level is greater than the first sub-current consumption level, wherein the first reference clock signal comprises a first sub-clock signal or a second sub-clock signal, wherein the first sub-clock signal is generated based on a first sub-current input, and wherein the second sub-clock signal is generated based on a second sub-current input greater than the first sub-current input.

8. The system of claim 7, wherein the control circuit is configured to determine whether the application is associated with the first sub-current consumption level or the second sub-current consumption level, wherein the control circuit is configured to select the first sub-clock signal or the second sub-clock signal based on whether the application is determined to be associated with the first sub-current consumption level or the second sub-current consumption level, wherein the first consumption level comprises the first sub-current consumption level or the second sub-current consumption level determined to be associated with the application, and wherein the first reference clock signal comprises the selected one of the first sub-clock signal or the second sub-clock signal.

9. The system of claim 1, further comprising a phase lock loop (PLL) configured to receive the selection and to generate a system clock signal based on the selection.

10. The system of claim 9, wherein executing the application based on the selection comprises:
    receiving the system clock signal from the PLL; and
    executing the application based on the system clock signal.

11. The system of claim 9, wherein a frequency of the system clock signal is another terminating rational number multiple of the sampling rate associated with the application.

12. The system of claim 11, wherein the another terminating rational number multiple is an integer multiple.

13. The system of claim 11, wherein the circuitry excludes at least one of a frequency conversion circuit and a filter circuit.

14. The system of claim 1, wherein the selection comprises the first reference clock signal, and wherein the application is executed when the system is not in at least one of a sleep state, a hibernation state, a suspended state, and a standby state.

15. The system of claim 1, wherein the application comprises at least one of a gaming application, a multimedia playback application, and an airplane mode operation.

16. A method for managing current consumption by an electronic device, the method comprising:
    identifying an application to be executed;
    determining whether the application utilizes a first reference clock signal having a first accuracy or a second reference clock signal having a second accuracy that is greater than the first accuracy based at least in part on whether a sampling rate associated with the application is a terminating rational number multiple of a first frequency of the first reference clock signal or a second frequency of the second reference clock signal;
    selecting the first reference clock signal or the second reference clock signal based on whether the sampling rate associated with the application is the terminating rational number multiple of the first frequency of the first reference clock signal or the second frequency of the second reference clock signal, wherein the first reference clock signal is generated based on a first current input, and wherein the second reference clock signal is generated based on a second current input greater than the first current input; and
    executing, by circuitry, the application based on the selection.

17. The method of claim 16, wherein determining whether the application utilizes the first reference clock signal or the second reference clock signal is further based at least in part on whether the application is associated with a first current consumption level or a second current consumption level that is greater than the first current consumption level.

18. The method of claim 17, wherein determining whether the application is associated with the first current consumption level or the second current consumption level comprises determining whether the first current consumption level or the second current consumption level is greater than or equal to a minimum current consumption level associated with the application.

19. A computer program product comprising instructions stored in a non-transitory computer-readable medium, the instructions comprising:
    instructions to identify an application to be executed;
    instructions to determine whether the application utilizes a first reference clock signal having a first frequency or a second reference clock signal having a second frequency based at least in part on whether a sampling rate associated with the application is a terminating rational number multiple of the first frequency or the second frequency;
    instructions to select the first reference clock signal or the second reference clock signal based on whether the sampling rate of the application is determined to be the terminating rational number multiple of the first frequency or the second frequency, wherein the first reference clock signal is generated based on a first current input and, the second reference clock signal is generated based on a second current input; and
    instructions to execute, by circuitry of an electronic device, the application based on the selection, wherein the application is executed when the electronic device is not in at least one of a sleep state, a hibernation state, a suspended state, or and a standby state.

* * * * *